United States Patent
Lee

(10) Patent No.: US 8,162,530 B2
(45) Date of Patent: Apr. 24, 2012

(54) HANDHELD ELECTRIC MIXER

(75) Inventor: William Kwok Kay Lee, Hong Kong (CN)

(73) Assignee: Main Power Electrical Factory Ltd., Kowloon (HK)

( * ) Notice: Subject to any disclaimer, the term of this patent is extended or adjusted under 35 U.S.C. 154(b) by 1057 days.

(21) Appl. No.: 11/867,924

(22) Filed: Oct. 5, 2007

(65) Prior Publication Data

US 2009/0091199 A1    Apr. 9, 2009

(51) Int. Cl.
*A47J 43/044* (2006.01)
(52) U.S. Cl. ............ 366/129; 366/601; 310/50
(58) Field of Classification Search ............ 366/129, 366/206, 343, 344, 601; 416/122, 170 R; 310/50
See application file for complete search history.

(56) References Cited

U.S. PATENT DOCUMENTS

| | | | | |
|---|---|---|---|---|
| 1,372,279 A | * | 3/1921 | Collins | 416/122 |
| 1,506,951 A | * | 9/1924 | Soukup | 416/122 |
| 1,774,509 A | * | 9/1930 | Gould | 74/371 |
| 1,905,114 A | * | 4/1933 | Lauterbur et al. | 74/810.1 |
| 1,910,303 A | * | 5/1933 | Maynard | 416/77 |
| 2,477,150 A | * | 7/1949 | Snyder et al. | 310/50 |
| 2,539,017 A | * | 1/1951 | Hansen | 74/16 |
| 2,737,371 A | * | 3/1956 | Gerry | 366/129 |
| 3,063,684 A | * | 11/1962 | Hayashi | 366/311 |
| 3,271,013 A | * | 9/1966 | Chambers et al. | 416/63 |
| 5,333,517 A | * | 8/1994 | Bryson et al. | 74/810.1 |

* cited by examiner

*Primary Examiner* — David Sorkin
(74) *Attorney, Agent, or Firm* — Leydig, Voit & Mayer, Ltd.

(57) ABSTRACT

A handheld electric mixer has a variable speed motor and a two-speed gearbox for transmitting driving torque of the motor to a pair of work pieces that mix, blend, beat or otherwise act upon a food item or recipe constituents. The gear box has a first gear ratio for providing a first range of output speeds and a second gear ratio for providing a second range of output speeds. The first ratio transmits at least twice as much torque to the rotational work pieces as does the second ratio. There is an electronic speed controller for controlling rotational speed the motor and a separate ratio selector for selecting between the first and second ratios of the gearbox.

9 Claims, 6 Drawing Sheets

HANDHELD ELECTRIC MIXER

BACKGROUND TO THE INVENTION

1. Field of the Invention

The current invention relates to handheld electric mixers and more particularly to variable speed handheld electric mixers.

2. Background Information handheld electric mixers consist of a housing with an uppermost handle and a pair of downwardly extending rotational output spindles that removeably receive work pieces for mixing, beating, blending and or whipping food items or recipe constituents. The spindles are driven by a variable speed motor located in the housing via a reduction gearbox. The electronic variable speed control can be a continuous type, in more expensive mixers, or a stepped speed control, comprising typically 3 stepped speeds, in less expensive mixers. Both speed control methods vary voltage to control the motor speed. Less expensive universal motors often used in such mixers might have a narrow speed torque range and so exhibit poor voltage speed control over the full speed range of the motor. This limits versatility of the mixer which ideally should be able to achieve very low mixer speeds for preparation of delicate food items or recipe constituents through to very high mixing speeds for thoroughly mixing, blending, beating, whipping or otherwise food items or recipe constituents.

SUMMARY OF THE INVENTION

It is an object of the present invention to provide a variable speed hand mixer which overcomes or substantially ameliorates the above problem, or at least provides the public with a useful alternative.

In view of the foregoing there is disclosed herein a handheld electric mixer comprising a housing, a pair of rotational output spindles located with the housing for holding mixer work pieces, a variable speed motor located in the housing and having a rotational output shaft, an electronic speed controller for controlling rotational speed the motor, and a two-speed gearbox located in the housing and receiving torque from the output shaft of the motor and transmitting the torque to the pair of rotational output spindles, wherein the gearbox has a first gear ratio for providing a first range of output speeds and a second ratio for providing a second range of output speeds, and wherein the first ratio transmits at least twice as much torque to the rotational output spindles as does the second ratio.

Preferably, the first ratio transmits three times as much torque to the rotational output spindles as does the second ratio.

Preferably, the gearbox comprises a pair of shafts rotationally coupling the motor and spindles, a pair of first ratio shaft gears positioned on the shafts, a pair of second ratio shaft gears positioned on the shafts and a selector mechanism located on one of the shafts for selecting between the first ratio shaft gears or the second ratio shaft gears.

Preferably, the output spindles include a par of spindle gears and the shafts are parallel to the output spindles such that the pair of shaft gears selectively engages with the pair of spindle gears.

Preferably, the shafts are perpendicular to the spindles, one of said shafts having a worm gear for rotationally engaging with the spindles gears and the other one of the shafts rotationally engaging the motor.

Preferably, one of each of the first and second ratio gears is freely rotatable on one of the shafts and wherein the selector mechanism comprises a clutch disk positioned on the shaft between the freely rotatable gears and moveable axially along the shaft for alternatively engaging with the freely rotatable gears for rotatable locking the engaged gear with the shaft.

Preferably, the clutch disk has opposed axial faces each having dogs for alternatively engaging the freely rotating gears and rotationally locking the engaged gear with the clutch disk.

Preferably, the clutch disk is axially captive with a shifter ring and the shifter ring is coupled to a linkage for moving the shifter ring axially between the freely rotating gears.

Preferably, in the first ratio position a first one of the shaft gears engages with a first one of the spindle gears and in the second ratio position a second one of the shaft gears engages with a second one of the spindle gears.

Further aspects of the invention will become apparent from the following description.

BRIEF DESCRIPTION OF THE DRAWINGS

An exemplary form of the present invention will now be described by way of example only and with reference to the accompanying drawings, in which.

DESCRIPTION OF THE EXEMPLARY EMBODIMENTS

Figure 1:
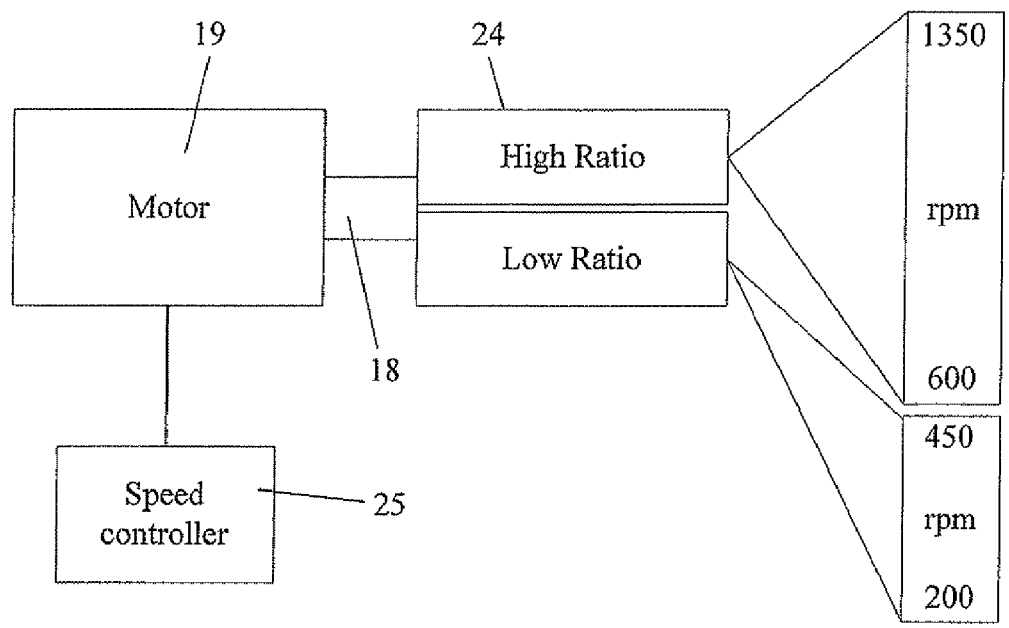
FIG. 1 is a schematic overview of the drive system for a variable speed handheld electric mixer according to the invention.
Figure 2:
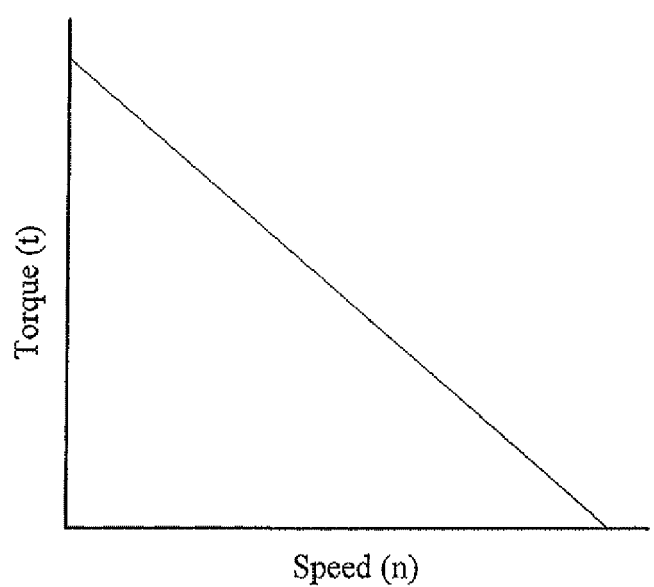
FIG. 2 is a typical speed/torque curve for an electric motor.
Figure 3:
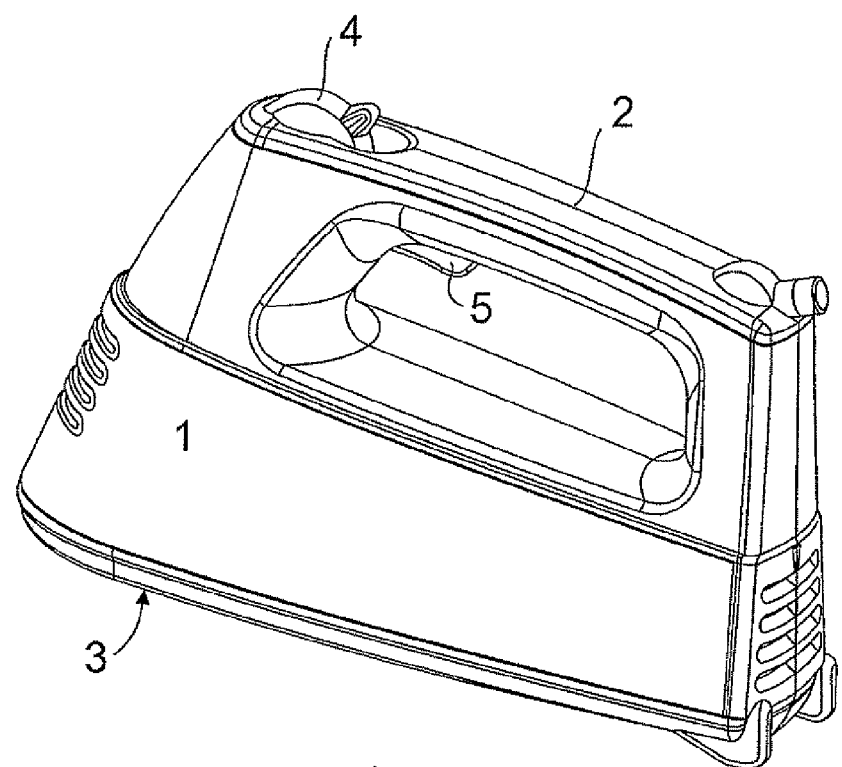
FIG. 3 is a perspective illustration of a variable speed handheld electric mixer according to the invention.
Figure 4:
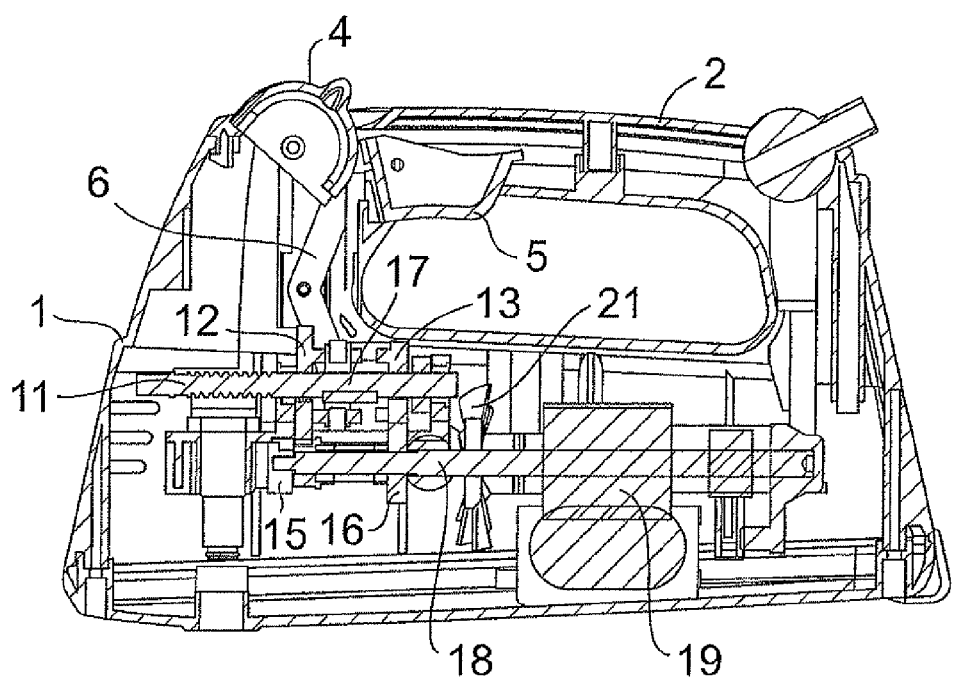
FIG. 4 is a section schematic illustration of the of a variable speed handheld electric mixer.
Figure 5:
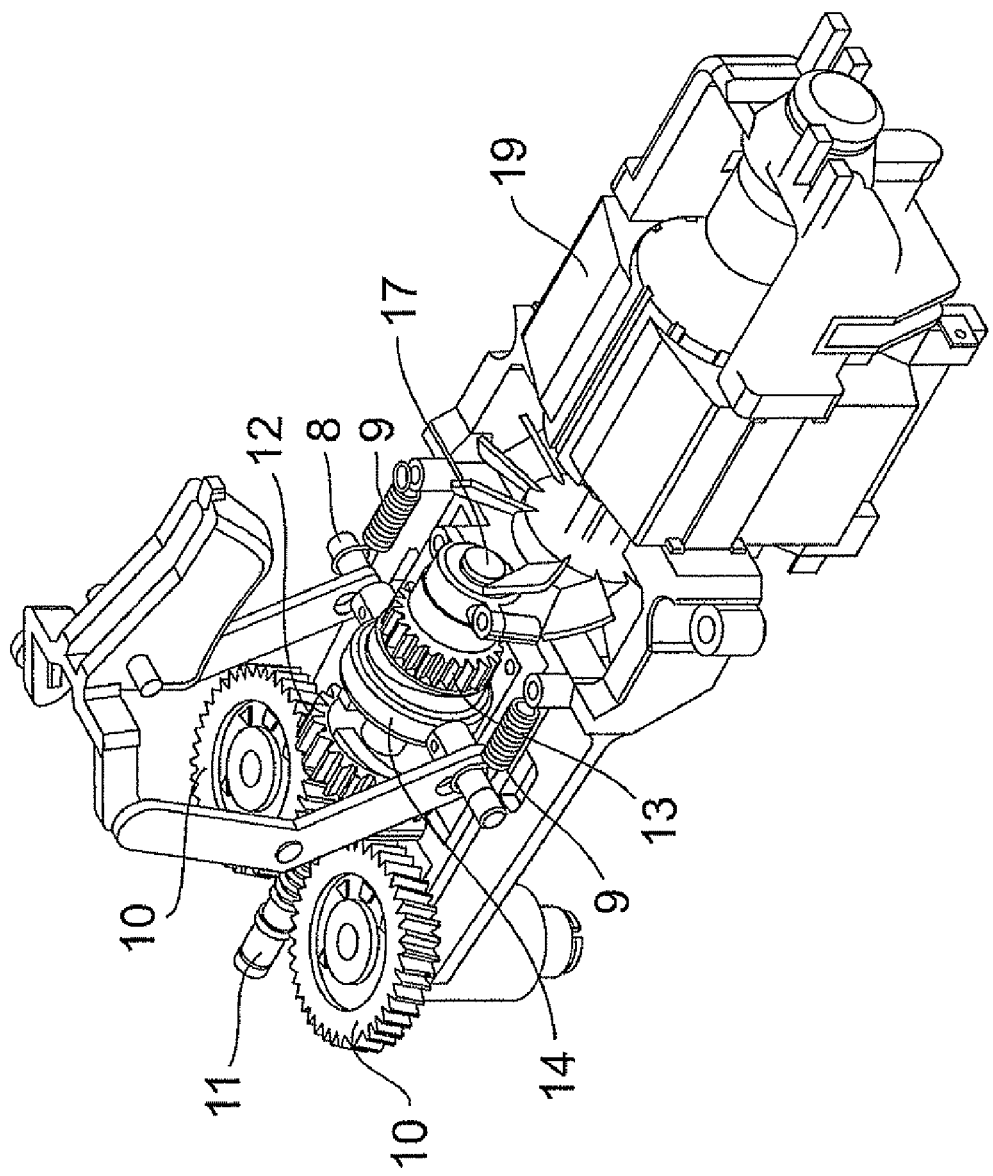
FIG. 5 is a perspective schematic illustration of the motor and gear box of the hand mixer.
Figure 6:
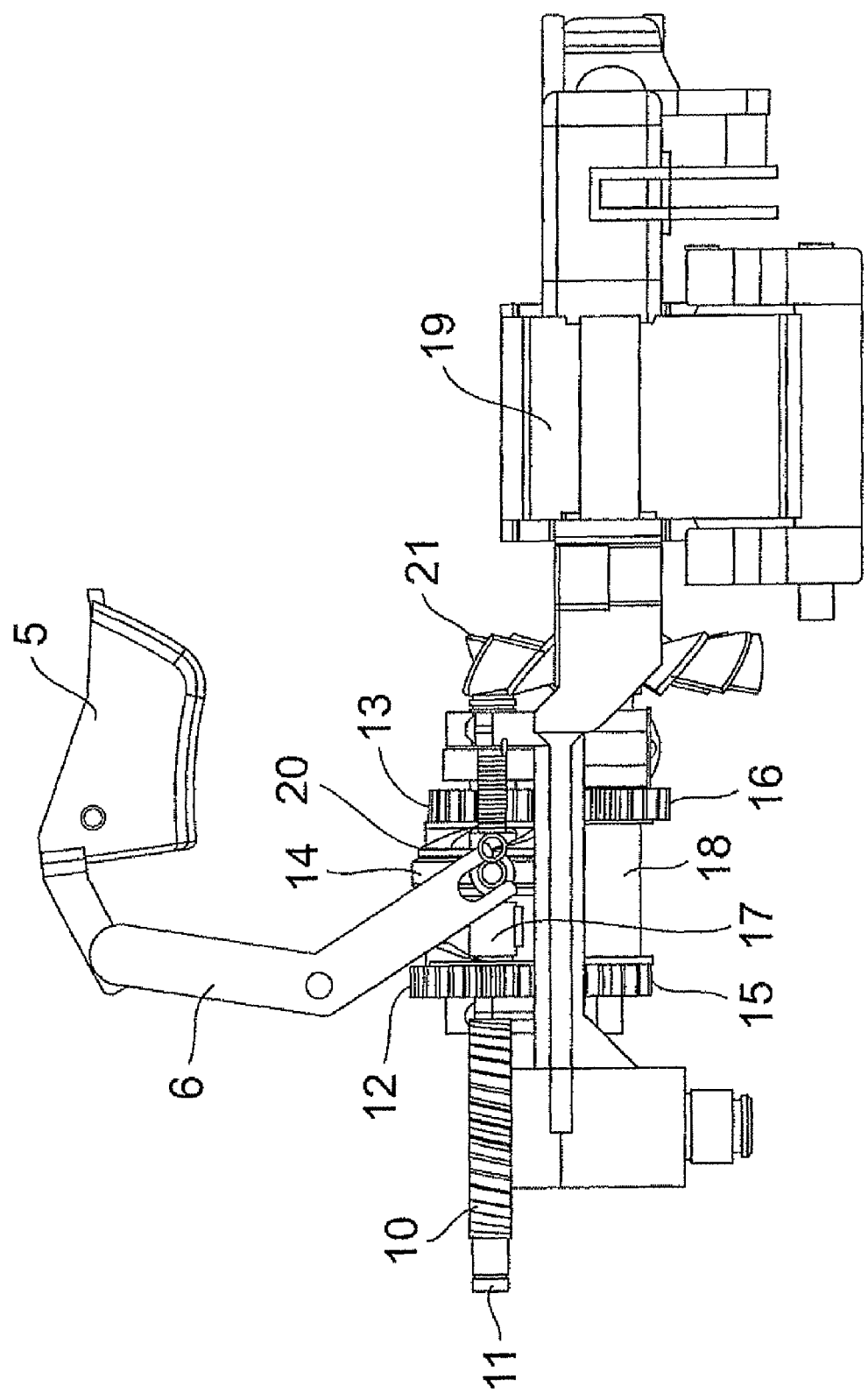
FIG. 6 is a first side schematic illustration of the motor and gear box.
Figure 7:
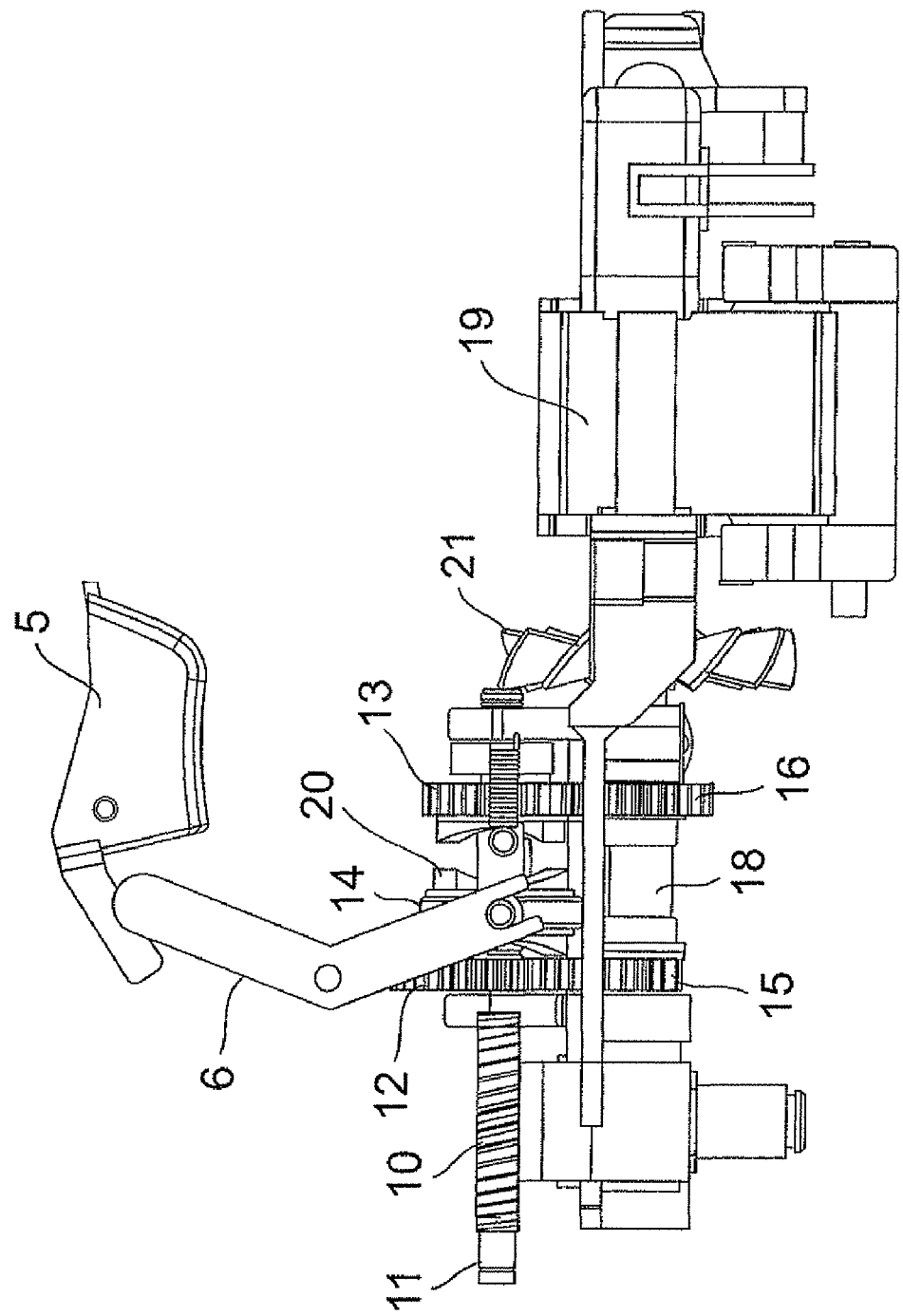
FIG. 7 is a second side schematic illustration of the motor and gear box.
Figure 8:
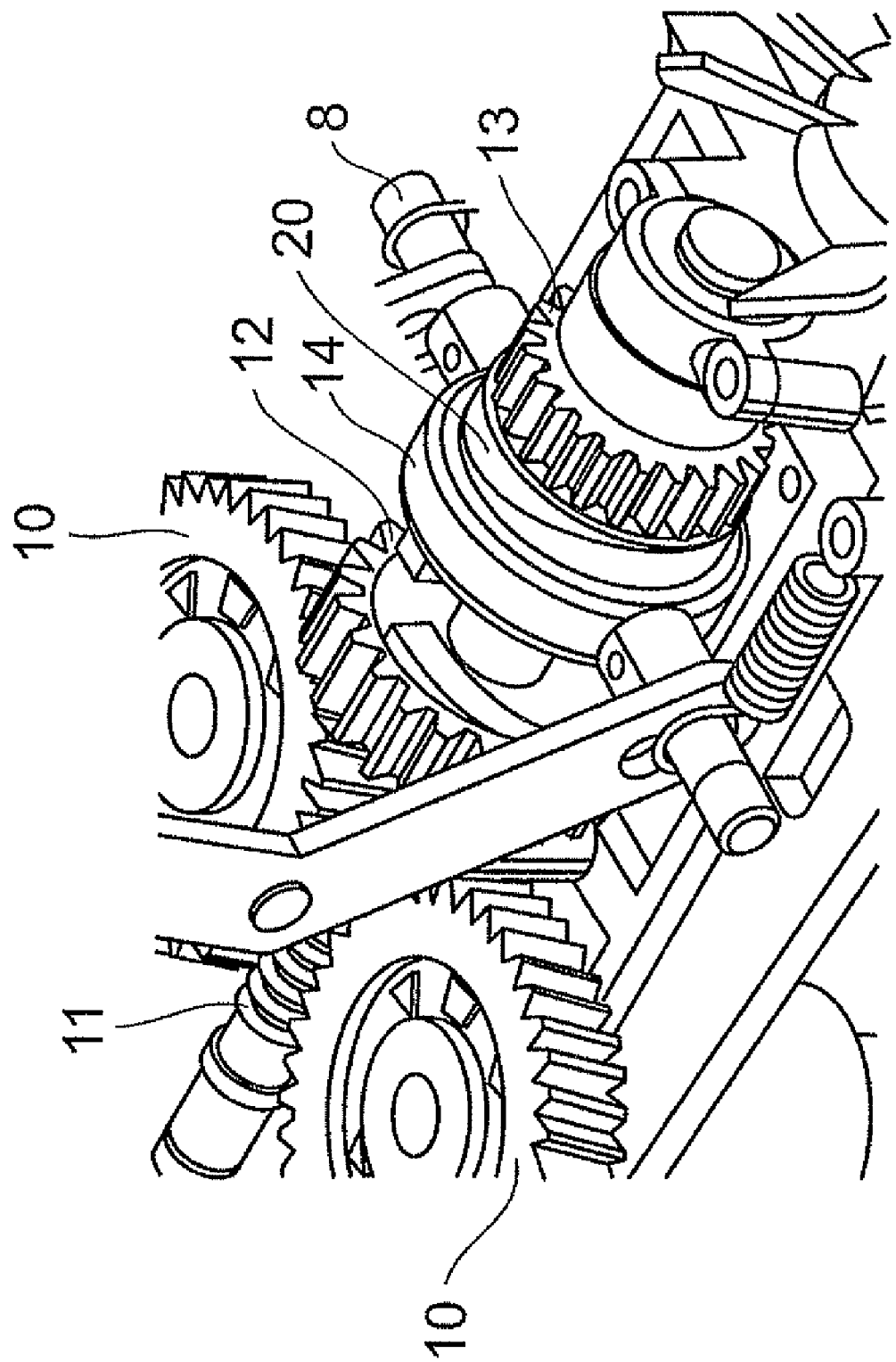
FIG. 8 is a perspective schematic illustration of a clutch of the gearbox.

A handheld electric mixer according to the present invention utilises both electronic and mechanical speed control means to provide greater speed and torque ranges than handheld electric mixers hitherto known in the art. Referring to FIGS. 1 and 2, the mixer is driven by a motor 19 having a rotational output shaft 18. Rotational speed of the motor 19 is controlled electronically by an electronic speed controller 25. A two-speed gearbox 24, having low and high gear ratios, receives torque from the output shaft 18 of the motor and transmits it to a pair of rotational output spindles 23. The combination of electronic speed controller 25 and two-speed gearbox 24 provides the chief or cook with a larger range of torque and speed for mixing, blending, beating or otherwise acting upon a food item or recipe constituents. As will be apparent to the skilled addressee, for any give power output torque is inversely proportional to speed (i.e. t=1/n, where t is torque and n is rotational velocity/speed). Therefore, the first, low, gearing ratio provides the mixer with a high torque and low speed output and the second, high, gearing ratio provides the mixer with a low torque and high speed output. In the preferred embodiment the first, low, gearing ratio provide an output speed range of 200-450 revolutions per minute (rpm)

for preparation of thick or delicate food items or recipe constituents and the second, high, gearing ratio provide an output speed range of 600-1350 rpm for thoroughly mixing, blending, beating, whipping or otherwise food item or recipe constituents. Mixer speed within each range is controlled via the variable speed motor controller 25. In the preferred embodiment, for any given electronic speed setting the low gearing ratio provides an output torque that is at least twice that of the high gearing ratio. The high gear ratio on the other hand provides a much wider speed/torque range that the low gearing ratio.

Referring to FIGS. 3 to 6 there is shown a preferred embodiment of a hand mixer according to the invention. The hand mixer comprises a housing 1 having a handle 2 for holding the mixer. On a top forward part of the handle is a thumb speed control switch 4 providing an input for the speed control circuit 25 that electronically controls the motor speed by varying voltage as is known in the art. On an underside of the handle there is a trigger operated mechanical speed ratio switch 5 for changing the speed ratio of the mixer. Accessible through an underside 3 of the housing is a pair of adjacent output spindles 23 for removably holding beaters or other work pieces for mixing, blending, beating or otherwise acting upon a food item or recipe constituents being worked upon.

Located within the housing is a drive motor 19 with voltage control electronics coupled to speed control switch 4 for varying the speed of the motor 19 as is known. The motor has an output shaft 18 on which there are a cooling fan 21 and two axially separated driving gears 15 and 16. Supported on a frame above output shaft 18 is a two ratio gearbox 24 arrangement having a lay-shaft 17 with a worm gear output 11 that engages with driving gears 10 mounted to rotate the spindles.

A pair of axially spaced gears 12, 13 is positioned on the lay-shaft 17 and mesh with the output shaft gears 15, 16 respectively. The lay-shaft gears 12, 13 are freely rotational with the lay-shaft 17. A first group of the gears 16 and 13 provides a first high-ratio gear set. In the preferred embodiment the drive gear 16 has 21 teeth and the driven gear 13 has 22 teeth. A second group of the gears 15 and 12 provides a low ratio gear set. In the preferred embodiment the driving gear 15 has 14 teeth and the driven gear 12 has 23 teeth. A clutch disk 20 is positioned on the lay-shaft 17 between the freely rotateable gears 12, 13. The clutch disk 20 is located on a key or spline so that it is axially slideable along the shaft, but rotateably locked with the shaft 17. The clutch disk 20 has dogs on both of its faces that can engage alternatively with the freely rotateable gears 13, 12 in order to rotationally lock the engaged gear 12 or 13 with the clutch disk 20 and thus shaft 17. When the clutch disk 20 is engaged with the high ratio gear 13 the output worm 11 is driven at a high gear ratio. When the disk 20 is engaged with the low ratio gear 12 the output worm 11 drives at low ratio.

The clutch disk 20 is axially captive within a shifter ring 14 which has two sticks 8 extending laterally there from. The sticks 8 and shifting ring 14 form a shifter that moves the clutch disk 20 axially along shaft 17 to engage with either low ratio gear 12 or high ratio gear 13 for selecting the output ratio of the mixer. A pair of springs 9 holds the clutch disk 20 in the high ratio engagement position under normal conditions. The trigger switch 5 is linked to the shifter ring 14 via a linkage 6 so that when the trigger switch 5 is operated by a user of the mixer the shifter ring 14 is moved against the spring 9 force to engage the clutch ring 20 with the low ratio output gear 12.

In the mixer of the invention the chief or cook has a larger range or speeds for mixing, blending, beating or otherwise acting upon a food item or recipe constituents. By selecting the first, low, gearing ratio and controlling the variable speed motor the cook has greater control of low mixer speeds for preparation of delicate food items or recipe constituents and by selecting the second, high, gearing ratio and controlling the variable speed motor the cook has a greater range of high mixing speeds for thoroughly mixing, blending, beating, whipping or otherwise food item or recipe constituents.

It should be appreciated that modifications and alternations to the invention that are obvious to those skilled in the art are not to be considered as beyond the scope of the present invention.

In one alternative embodiment there is a pair of gears is rotationally concentric and spaced apart along the respective spindles. There is also a pair of parallel lay-shafts such that one lay-shaft is associated with a respective one of the pair of spindles. Positioned on each lay-shaft is a second pair of toothed gears complimentary to the gears on it respective spindle. Each pair of second gears is rotationally concentric and spaced apart along the respective lay-shaft. Within the housing is a variable speed motor and motor control for rotating the lay-shafts which are both rotateably engaged with the motor for rotation of the lay-shafts with the motor.

A selector knob is positioned on the housing of the mixer and associated with a cam mechanism for selectively moving the pairs of second gears longitudinally long the respective lay-shafts between a first position and a second position. Rotation of the selector knob in a first direction moves the pairs of second gears up the lay-shafts until the first ones of the second pairs of gears mesh with the first ones of the pairs of spindle gears. The meshing first gears have diameters and tooth numbers for a first, low, gearing second gears have diameters and tooth numbers for a second, high, gearing ratio causing the output spindles to have a second rotational speed range controlled by the variable speed motor.

What is claimed is:

1. A handheld electric mixer comprising:
    a housing,
    a pair of rotational output spindles located in the housing for holding mixer work pieces,
    a variable speed motor located in the housing and having a rotational output shaft,
    an electronic speed controller for controlling rotational speed of the motor, and
    a two-speed gearbox located in the housing, receiving torque from the output shaft of the motor, and transmitting the torque to the pair of rotational output spindles, wherein
        the two-speed gearbox has a first ratio for providing a first range of output speeds and a second ratio for providing a second range of output speeds, and the first ratio transmits at least twice as much torque to the pair of rotational output spindles as does the second ratio,
        the two-speed gearbox comprises
            a pair of shafts rotationally coupling the motor to the pair of rotational output spindles,
            a pair of first ratio shaft gears positioned on the pair of shafts,
            a pair of second ratio shaft gears positioned on the pair of shafts, wherein one of the first and second ratio shaft gears of each of the pairs of first and second ratio shaft gears is a freely rotatable gear, freely rotatable on a first of the shafts, and
            a selector mechanism located on the first shaft for selecting between the first ratio shaft gears and the second ratio shaft gears, the selector mechanism comprising a clutch disk positioned on the first shaft, between the freely rotatable gears, and moveable axially along the first shaft for alternatively engaging and rotatably locking the freely rotatable gear that is engaged with the clutch disk.

2. The handheld electric mixer of claim 1 wherein the clutch disk has opposed axial faces, each face having dogs for alternatively engaging the freely rotating gears and rotationally locking the freely rotatable gear that is engaged with the clutch disk.

3. The handheld electric mixer of claim 1 including a shifter ring and a linkage, wherein the clutch disk is axially captive with the shifter ring and the shifter ring is coupled to the linkage for moving the shifter ring axially between the freely rotating gears.

4. The handheld electric mixer of claim 1 wherein, in a first ratio position, a first of the ratio shaft gears of each of the pair of first and second ratio shaft gears engages the pair of rotational output spindles, and, in a second ratio position, a second of the ratio shaft gears of each of the pair of first and second ratio shaft gears engages the pair of rotational output spindles.

5. A handheld electric mixer comprising:
a housing,
a pair of rotational output spindles located in the housing for holding mixer work pieces,
a variable speed motor located in the housing and having a rotational output shaft,
an electronic speed controller for controlling rotational speed of the motor, and
a two-ratio gearbox located in the housing, receiving torque from the output shaft of the motor, and transmitting the torque to the pair of rotational output spindles, wherein
the two-ratio gearbox has a first gear ratio for transmitting a first range of torque to the pair of rotational output spindles and a second gear ratio for transmitting a second range of torque to the pair of rotational output spindles, and the second range of torque is at least twice the first range or torque
the two-ratio gearbox comprises
a pair of shafts rotationally coupling the motor to the pair of rotational output spindles,
a pair of first ratio shaft gears positioned on the pair of shafts,
a pair of second ratio shaft gears positioned on the pair of shafts, wherein one of the first and second ratio shaft gears of each of the pairs of first and second ratio shaft gears is a freely rotatable gear, freely rotatable on a first shaft of the pair of shafts, and
a selector mechanism located on the first shaft for selecting between the first ratio shaft gears and the second ratio shaft gears, the selector mechanism comprising a clutch disk positioned on the first shaft between the freely rotatable gears and moveable axially along the first shaft for alternatively engaging the freely rotatable gears and rotatably locking the freely rotatable gear that is engaged with the clutch disk.

6. The handheld electric mixer of claim 5 wherein the clutch disk has opposed axial faces, each face having dogs for alternatively engaging the freely rotating gears and rotationally locking the freely rotating gear that is engaged with the clutch disk.

7. The handheld electric mixer of claim 5 including a shifter ring and a linkage, wherein the clutch disk is axially captive with the shifter ring and the shifter ring is coupled to the linkage for moving the shifter ring axially between the freely rotating gears.

8. The handheld electric mixer of claim 5 wherein, in a first ratio position, a first of the ratio shaft gears of each of the pair of first and second ratio shaft gears engages the pair of rotational output spindles, and, in a second ratio position, a second of the ratio shaft gears of each of the pair of first and second ratio shaft gears engages the pair of rotational output spindles.

9. A handheld electric mixer comprising:
a pair of rotational output spindles for holding mixer work pieces,
an electric variable speed motor for driving the pair of rotational output spindles, and
an output speed selector coupling the motor to the pair of rotational output spindles, wherein the speed selector comprises
a pair of shafts rotationally coupling the motor to the pair of rotational output spindles,
a pair of high ratio shaft gears positioned on the pair of shafts,
a pair of low ratio shaft gears positioned on the pair of shafts,
a selector mechanism located on one shaft of the pair of shafts for selecting between one of the pair of high ratio shaft gears and the pair of low ratio shaft gears, and
a biasing spring biasing the selector mechanism to select the pair of high ratio shaft gears.

* * * * *